United States Patent
Wallner et al.

[11] Patent Number: 6,102,435
[45] Date of Patent: *Aug. 15, 2000

[54] VEHICLE HEADLINER WITH INFLATABLE SIDE CURTAIN

[75] Inventors: John P. Wallner, Rochester; Rodger M. Cherry, Grosse Pointe; Robert I. Phillion, Ray Township, all of Mich.

[73] Assignee: TRW Vehicle Safety Systems Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/119,695
[22] Filed: Jul. 21, 1998
[51] Int. Cl.⁷ .............................. B60R 21/22; B60R 21/16
[52] U.S. Cl. ...................... 280/730.2; 280/728.2
[58] Field of Search .............................. 280/730.1, 730.2, 280/728.2

[56] References Cited

U.S. PATENT DOCUMENTS

| | | |
|---|---|---|
| 2,834,606 | 5/1958 | Bertrand . |
| 5,265,903 | 11/1993 | Kuretake et al. ........................ 280/730 |
| 5,362,097 | 11/1994 | Barske . |
| 5,462,308 | 10/1995 | Seki et al. ............................. 280/730.2 |
| 5,755,457 | 5/1998 | Specht ................................... 280/730.2 |
| 5,788,270 | 8/1998 | HAland et al. ......................... 280/730.2 |
| 5,791,683 | 8/1998 | Shibata et al. ......................... 280/730.2 |
| 5,865,462 | 2/1999 | Robbins et al. ........................ 280/730.2 |
| 5,884,937 | 3/1999 | Yamada ................................. 280/730.2 |
| 5,988,735 | 11/1999 | Müller . |

*Primary Examiner*—Lanna Mai
*Assistant Examiner*—Jeffrey J. Restifo
*Attorney, Agent, or Firm*—Tarolli, Sundheim, Covell, Tummino & Szabo L.L.P.

[57] ABSTRACT

An apparatus (10) for helping to protect an occupant of a vehicle having a roof (40) and a side structure (20) includes an inflatable vehicle occupant protection device (12) and a fill tube (120) for directing inflation fluid into the protection device. The protection device (12) has a deflated condition and an inflated condition in which it is inflated between the occupant and the vehicle side structure. The apparatus (10) also includes means for mounting the protection device (12) and the fill tube (120) to the vehicle. The mounting means comprises a headliner assembly (70) having a headliner portion (72) extending inside of and generally parallel to the vehicle roof (40). The headliner assembly (70) has a support portion (74) disposed adjacent to the vehicle side structure (20). The support portion (74) of the headliner assembly (70) defines a chamber (112) receiving the fill tube (120) and the protection device (12) when the protection device is in the deflated condition.

14 Claims, 4 Drawing Sheets

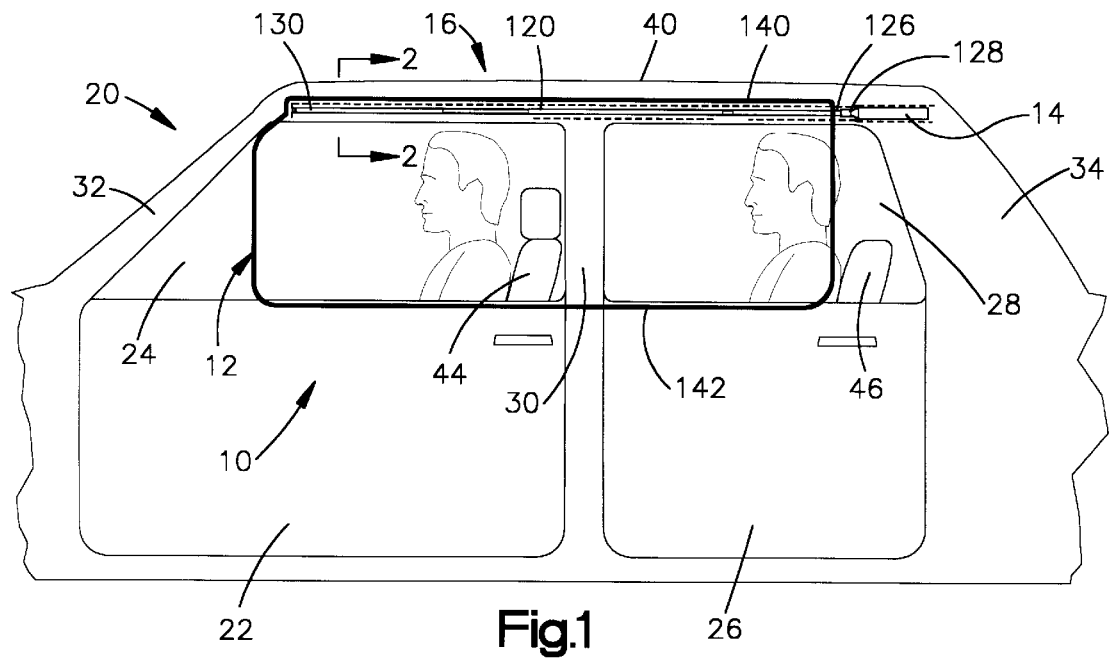
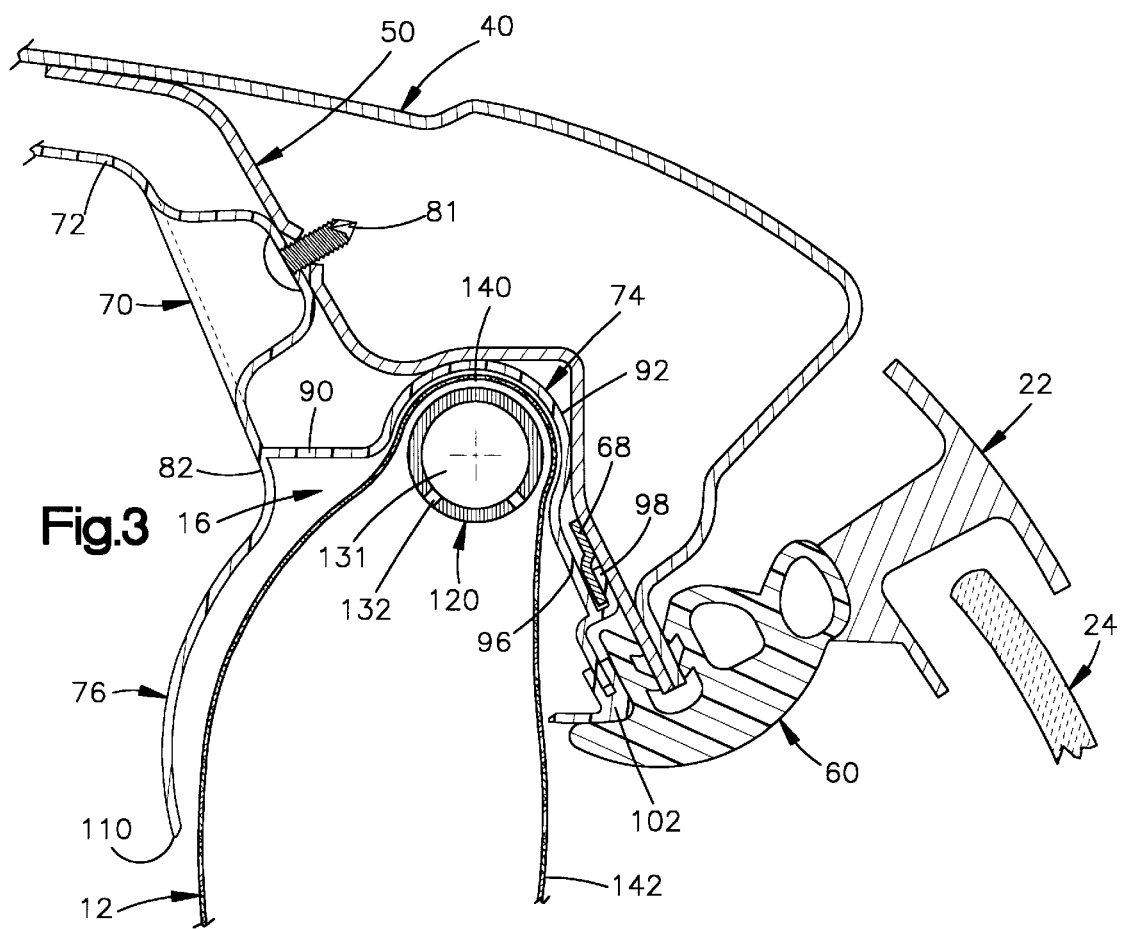

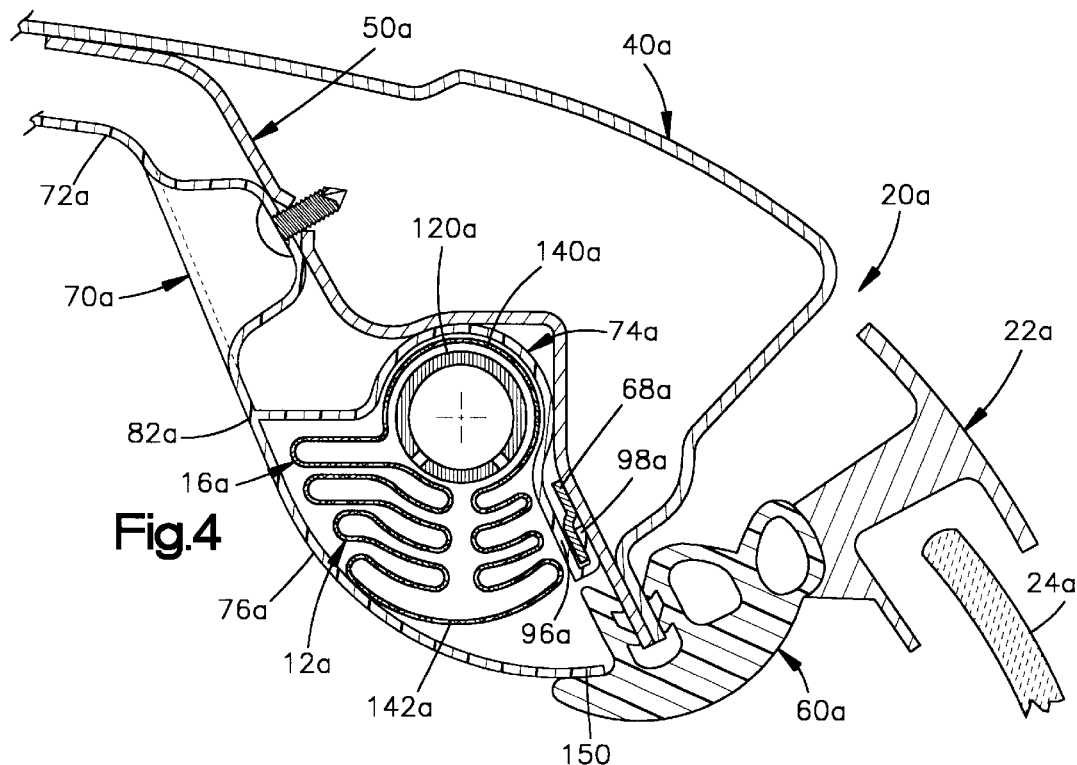
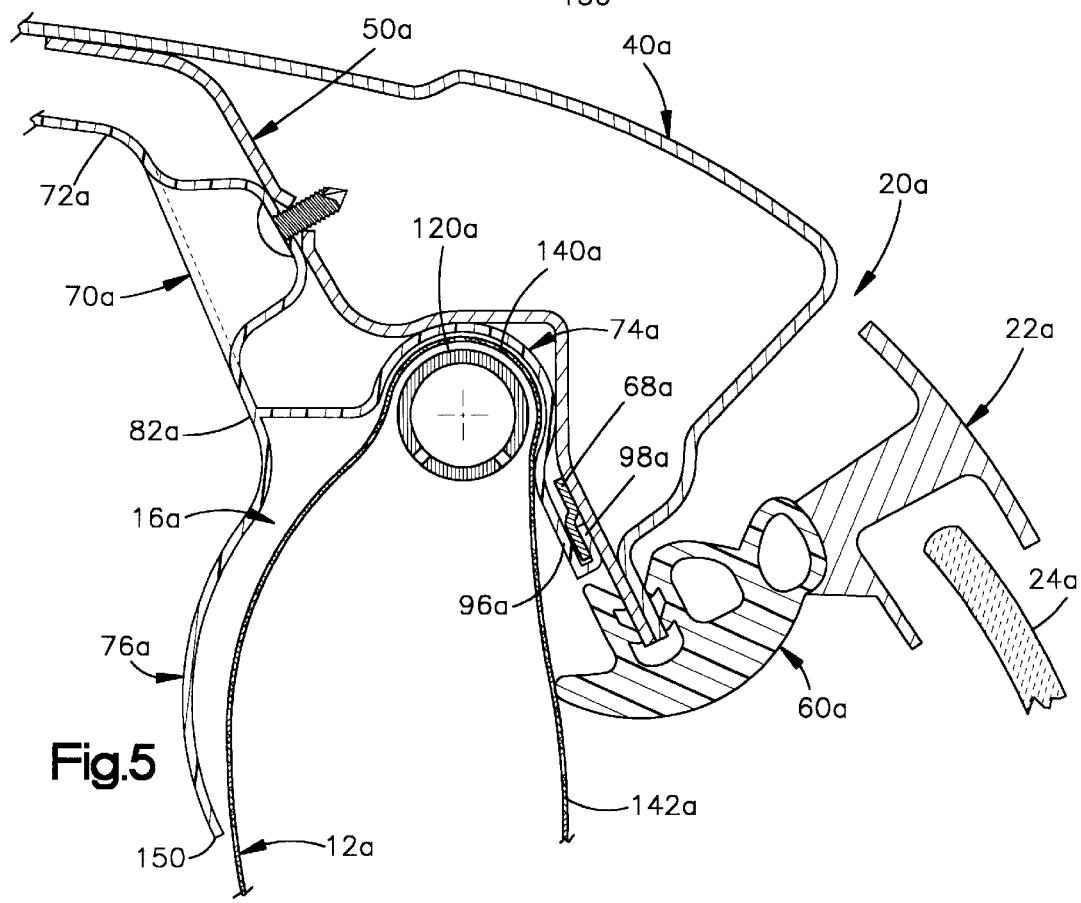

VEHICLE HEADLINER WITH INFLATABLE SIDE CURTAIN

BACKGROUND OF THE INVENTION

1. Technical Field

The present invention relates to a vehicle safety apparatus. In particular, the present invention relates to an inflatable vehicle occupant protection device, such as a side curtain, for helping to protect a vehicle occupant in the event of a side impact to a vehicle.

2. Description of the Prior Art

It is known to inflate an air bag to help protect a vehicle occupant in the event of a vehicle collision. Some vehicles include a side curtain which is inflatable downward inside the side structure of the vehicle to help protect a vehicle occupant in the event of a side impact to the vehicle.

The side curtain is typically stored in a deflated condition along the roof rail above the side windows of the vehicle. The side curtain is part of a module including an inflator. The module is attached to the sheet metal of the vehicle and then is covered with a trim panel. A separate headliner extends from the trim panel laterally inward along the roof of the vehicle. The side curtain inflates through the trim panel.

SUMMARY OF THE INVENTION

The present invention is a vehicle occupant safety apparatus for helping to protect an occupant of a vehicle having a roof and a side structure. The apparatus comprises an inflatable vehicle occupant protection device having a deflated condition and having an inflated condition in which the protection device is inflated between the occupant and the vehicle side structure. The apparatus comprises a fill tube for directing inflation fluid into the protection device to inflate the protection device. The apparatus also comprises means for mounting the protection device and the fill tube to the vehicle. The mounting means comprises a headliner assembly having a headliner portion extending inside of and generally parallel to the vehicle roof. The headliner assembly has a support portion disposed adjacent to the vehicle side structure. The support portion of the headliner assembly defines a chamber receiving the fill tube and the protection device when the protection device is in the deflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic side view of a portion of a vehicle including a vehicle safety apparatus in accordance with the present invention;

FIG. 3 is a view similar to FIG. 2 showing the side curtain in an inflated condition;

FIG. 4 is a view similar to FIG. 2 showing a vehicle safety apparatus in accordance a second embodiment of the present invention, including a side curtain shown in a deflated condition;

FIG. 5 is a view similar to FIG. 4 showing the side curtain of FIG. 4 in an inflated condition.

DESCRIPTION OF PREFERRED EMBODIMENTS

Figure 2:
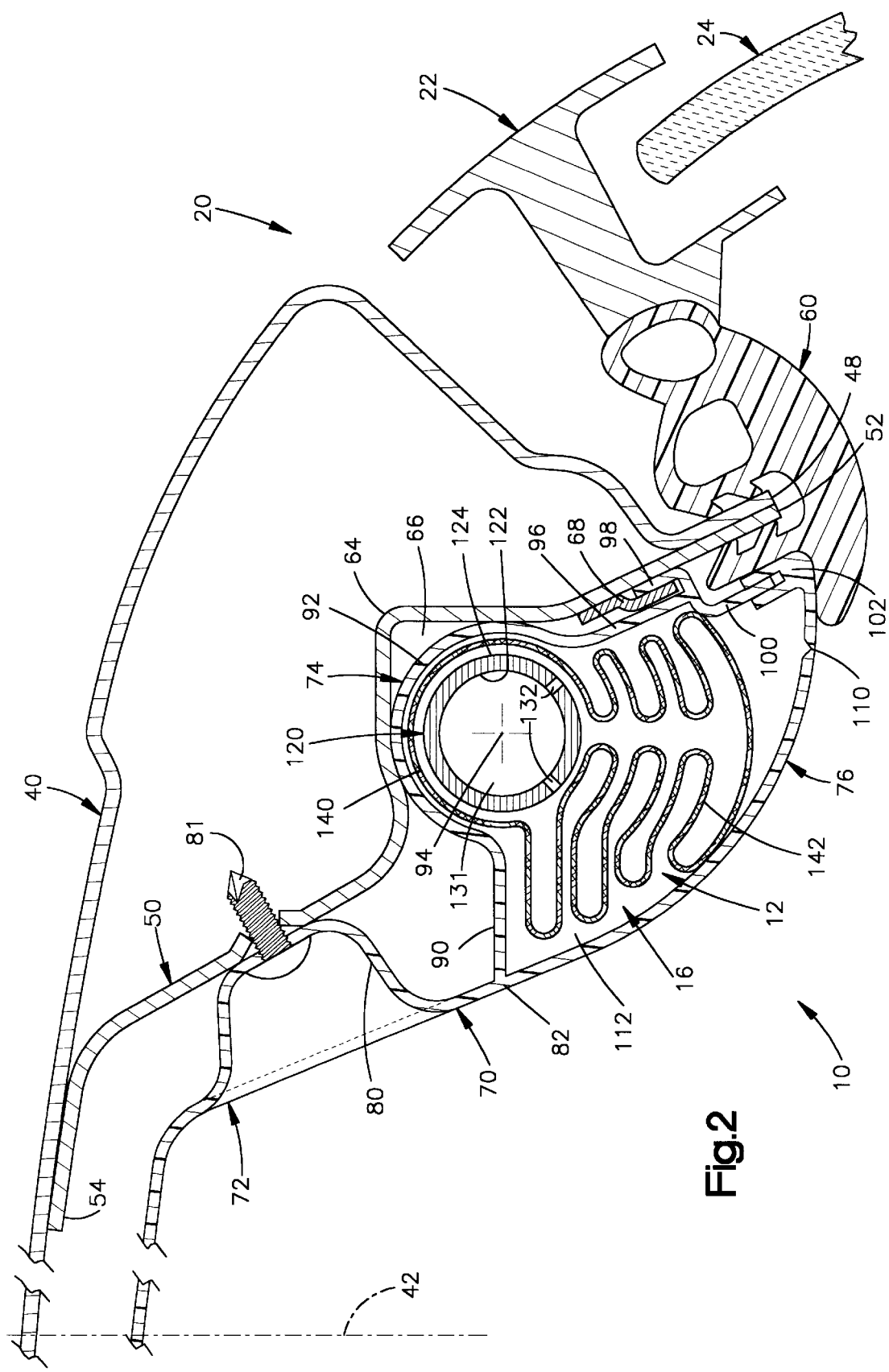
FIG. 2 is a sectional view, taken generally along line 2—2 of FIG. 1, of the vehicle safety apparatus of FIG. 1 including a side curtain shown in a deflated condition.

The present invention relates to a vehicle safety apparatus. In particular, the present invention relates to an inflatable vehicle occupant protection device, such as a side curtain, for helping to protect an vehicle occupant in the event of a side impact to a vehicle. As representative of the present invention, FIG. 1 illustrates schematically a vehicle safety apparatus 10 including an inflatable vehicle occupant protection device or side curtain 12.

The safety apparatus 10 (FIG. 1) includes an inflator 14 for inflating the side curtain 12. The inflator 14 preferably contains a stored quantity of pressurized inflation fluid in the form of gas to inflate the protection device 12. The inflator 14 alternatively could contain a combination of pressurized inflation fluid and ignitable material for heating the inflation fluid, or could be a pyrotechnic inflator which uses the combustion of gas-generating material to generate inflation fluid. The side curtain 12 and the inflator 14 are parts of a protection device module 16 as described below.

The vehicle has a side structure 20 (FIG. 1) which includes a front door 22 and a front side window 24. The vehicle side structure 20 also includes a back door 26 and a back side window 28. The vehicle B-pillar 30 is disposed between the front side window 24 and the back side window 28. The side structure 20 also includes the vehicle A-pillar 32 and C-pillar 34. A metal roof or roof panel 40 of the vehicle extends laterally in the vehicle, from the vehicle side structure 20 past the vehicle centerline 42.

The vehicle has a front seat 44 and a back seat 46. When a vehicle occupant sits in the front seat 44, the occupant is adjacent to the vehicle front door 22 and front window 24. The side of the occupant's head is adjacent to the front side window 24. The top of the occupant's head is adjacent to the roof panel 40.

As illustrated in FIG. 2, the roof panel 40 has an outer edge portion 48. The vehicle side structure includes a sheet metal support member 50 inside the roof panel 40. The support member 50 has an outer edge portion 52 welded to the outer edge portion 48 of the roof panel 40. An inner edge portion 54 of the support member 50 is welded to the roof panel 40 at the inward boundary of the vehicle side structure 20. The outer portion of the roof panel 40, together with the support member 50, forms the roof rail of the vehicle.

The vehicle side structure 20 also includes a bulb seal 60 which is supported on the outer edge portion 48 of the roof panel 40 and the outer edge portion 52 of the support member 50. The vehicle front door 22, which supports the front side window 24, is engageable with the bulb seal 60 when the door is closed.

A central portion 64 of the support member 50 is bent at an angle of about ninety degrees to form a receiving channel 66 presented inward of the vehicle. A headliner assembly support tab 68 is disposed on the support member 50 at a location between the receiving channel 66 and the outer edge portion 52 of the support member. (It should be understood that the parts shown in FIG. 2 are representative of the vehicle structure along substantially the entire length of the vehicle side structure 20. Items such as the headliner assembly support tab 68, for example, may or may not be continuous along the length of the vehicle side structure 20.)

The vehicle includes a headliner assembly 70 which supports the inflator 14 and the side curtain 12 as described below. The headliner assembly 70 is formed as one piece from a relatively stiff plastic backing material with a fibrous overlay visible on the inside of the headliner assembly, that is, toward the vehicle occupant compartment. The headliner assembly 70 covers the inside of the roof panel 40 and the support member 50. The headliner assembly 70 is the only interior trim which is visible from inside the vehicle occupant compartment, between the vehicle centerline 42 and the bulb seal 60.

The headliner assembly 70 includes a headliner portion 72, a support portion 74 or housing portion, and a door 76. The headliner portion 72 of the headliner assembly extends inward from the side structure 20 of the vehicle to and past the vehicle centerline 42. The headliner portion 72 of the headliner assembly 70 extends generally parallel to the roof panel 40 and is disposed inward of the roof panel. The headliner portion 72 of the headliner assembly 70 has a plurality of mounting bosses, one of which is shown at 80. The mounting bosses 80 are clamped to the sheet metal support member 50 by fasteners 81, such as screws, to secure the headliner assembly 70 to the sheet metal support member.

The headliner portion 72 of the headliner assembly 70 terminates at a hinge point 82. From the hinge point 82, the housing portion 74 of the headliner assembly 70 extends along the sheet metal support member 50 to the bulb seal 60. The housing portion 74 has a generally planar first part 90 which extends outward from the hinge point 82 in a direction toward the receiving channel 66 of the sheet metal support member 50. An arcuate second part 92 of the housing portion 74 of the headliner assembly 70 extends from the first part 90. The second part 92 has a circumferential extent about a longitudinal axis 94 of greater than 180 degrees, and preferably about 210 degrees.

A generally planar third part 96 of the channel portion 74 extends downward from the second part 92. The third part 96 terminates in a U-shaped mounting portion 98. The U-shaped mounting portion 98 receives the metal headliner assembly mounting tab 60 to help secure the housing portion 74 to the sheet metal support member 50.

The housing portion 74 of the headliner assembly 70 has an edge portion 100 which extends generally downward from the U-shaped mounting portion 98. The edge portion 100 is received in another U-shaped connector part 102 which is releasably connected with the door 76 as described below.

The door 76 of the headliner assembly 70 extends downward and outward in a generally arcuate cross-sectional configuration from the hinge point 82. The door 76 is part of the visible portion of the headliner assembly 70 when the headliner assembly is mounted in the vehicle. The door 76 terminate, at a tear seam 110. The tear seam 110 is a predetermined weakened portion of the headliner assembly 70 which is rupturable upon inflation of the side curtain 12 to enable deployment of the side curtain into the vehicle occupant compartment.

The door 76 is connected by the tear seam 110 to the connector part 102 of the housing portion 74. As a result, the housing portion 74 and the door 76 together define a chamber 112 in the headliner assembly 70. The chamber 112 extends along the length of the vehicle side structure 20.

The protection device module 16, which includes the side curtain 12 and the inflator 14, also includes a fill tube 120. The fill tube 120 has a cylindrical configuration including parallel, cylindrical inner and outer side surfaces 122 and 124 centered on the axis 94. A first end portion 126 (FIG. 1) of the fill tube 120 is connected by a clamp 128 with the output of the inflator 14 adjacent to the C-pillar 34 of the vehicle. An opposite second end portion 130 of the fill tube 120 is disposed adjacent to the A-pillar 32 of the vehicle.

The inner side surface 122 of the fill tube 120 defines a fluid flow passage 131 in the fill tube. A series of nozzles or outlets 132 are formed in the fill tube 120 at spaced locations along its length. The outlets 132 extend radially between the inner and outer side surfaces 122 and 124 of the fill tube 120.

The side curtain 12 has a mounting portion 140 and an occupant contact portion 142. The mounting portion 140 of the side curtain 12 extends circumferentially around the fill tube 120. The fill tube 120 thus extends axially through the mounting portion 140 of the side curtain 12. The occupant contact portion 142 of the side curtain 12 is connected in fluid communication with the mounting portion 140 of the side curtain. The protection device module, including the fill tube 120, the side curtain 12 (in its deflated condition), and the inflator 14, is stored in the chamber 112 of the headliner assembly 70, between the housing portion 74 and the door 76.

The outer diameter of the fill tube 120 is selected so that the fill tube and the mounting portion 140 of the side curtain 12 are retained in the arcuate second part 92 of the housing portion 74 of the headliner assembly 70. To install the fill tube 120 and the side curtain 12 in the housing portion 74, the housing edge portion is separated from the connector part 102 so that the door 76 is effectively open. The second part 92 of the housing portion 74 is resiliently deformed angularly, by spreading apart the first and third parts 90 and 96 of the housing portion. This enables radial movement of the fill tube 120 and the side curtain mounting portion 140 into the second part 92 of the housing portion. When the fill tube 120 and the side curtain mounting portion 140 are moved into the position shown in FIG. 2, the first and third parts 92 and 96 of the housing portion are released and the housing portion snaps back to the condition shown in FIG. 2. The second part 92 of the housing portion 74 extends more than 180 degrees around the fill tube 120, thereby holding the fill tube and the side curtain 12 in place in the headliner assembly 70. The housing portion 74 of the headliner assembly 70 secures the side curtain 12 and the fill tube 70 by gripping or clamping them without fasteners.

After the fill tube 120 and side curtain 12 are mounted in the headliner assembly 70, the door 76 and the edge portion 100 are swung back toward the housing portion 74. The edge portion 100 is inserted into the U-shaped connector part 102 to hold the door 76 closed. The housing portion 74 of the headliner assembly 70 is disposed in the receiving channel 66 of the sheet metal support member 50.

The fill tube 120 and side curtain 12 are preferably mounted in the headliner assembly 70 prior to the mounting of the headliner assembly to the vehicle sheet metal. In this way, the number of assembly steps which the vehicle manufacturer has to perform is reduced significantly. In addition, the vehicle does not use any interior roof trim pieces which are separate from the one-piece headliner assembly 70 and which may detach from the vehicle side structure 20 upon inflation of the side curtain 12.

The safety apparatus 10 includes electric circuitry (not shown) including a sensor for sensing a vehicle condition such as a side impact to the vehicle 12 or a vehicle rollover condition. The electric circuitry also includes a controller for actuating the inflator 14 in response to the output of the sensor. Upon the occurrence of a vehicle condition for which inflation of the protection device 12 is desired to help protect the occupant of the vehicle, the sensor and the controller cooperate to send an actuation signal to the inflator over lead wires. The inflator 14 is actuated and inflation fluid is directed from the inflator into the passage 131 in the fill tube 120.

Inflation fluid flows out of the fill tube 120 through the nozzles 132 in the fill tube. The inflation fluid flows into the mounting portion 140 of the side curtain 120 and begins to inflate the occupant contact portion 142 of the side curtain.

The inflating side curtain 12 presses outwardly on the door 76 of the headliner assembly 70. The headliner assembly 70 ruptures at the predetermined weakened portion 110. The door 76 pivots open at the hinge point 82, enabling the occupant contact portion 142 of the side curtain 12 to inflate into the vehicle occupant compartment, as shown in FIG. 3. The side curtain 12 inflates generally vertically downward in the vehicle, inside the side structure 20 of the vehicle, to help protect an occupant of the vehicle.

FIGS. 4 and 5 illustrate a safety apparatus 10a in accordance with a second embodiment of the present invention. The safety apparatus 10a is similar in construction to the safety apparatus 10 (FIGS. 1–4) and parts which are the same are given the same reference numerals with the suffix "a" added for clarity.

The door 76a of the headliner assembly 70a (FIGS. 4 and 5) is retained in a different manner than the door 76 (FIGS. 1–3). Specifically, the headliner assembly 70a does not have a tear seam such as the tear seam 110 (FIGS. 2–3). The housing portion 74a of the headliner assembly 70a terminates at the mounting tab 68a. The door 76a has an outer edge portion 150, spaced from the hinge point 82a, which is releasably received under the bulb seal 60a. The engagement of the bulb seal 60a with the outer edge portion 150 of the door 76a maintains the door in the closed condition when the side curtain 12a is in the deflated condition.

Upon inflation of the side curtain 12a, the inflating side curtain presses outwardly on the door 76a of the headliner assembly 70a. The outer edge portion 150 of the door 76a is pulled out from under the bulb seal 60a. The door 76a pivots open at the hinge point 82a, as shown in FIG. 5, enabling the occupant contact portion 142a of the side curtain 12a to inflate into the vehicle occupant compartment.

Figure 6:
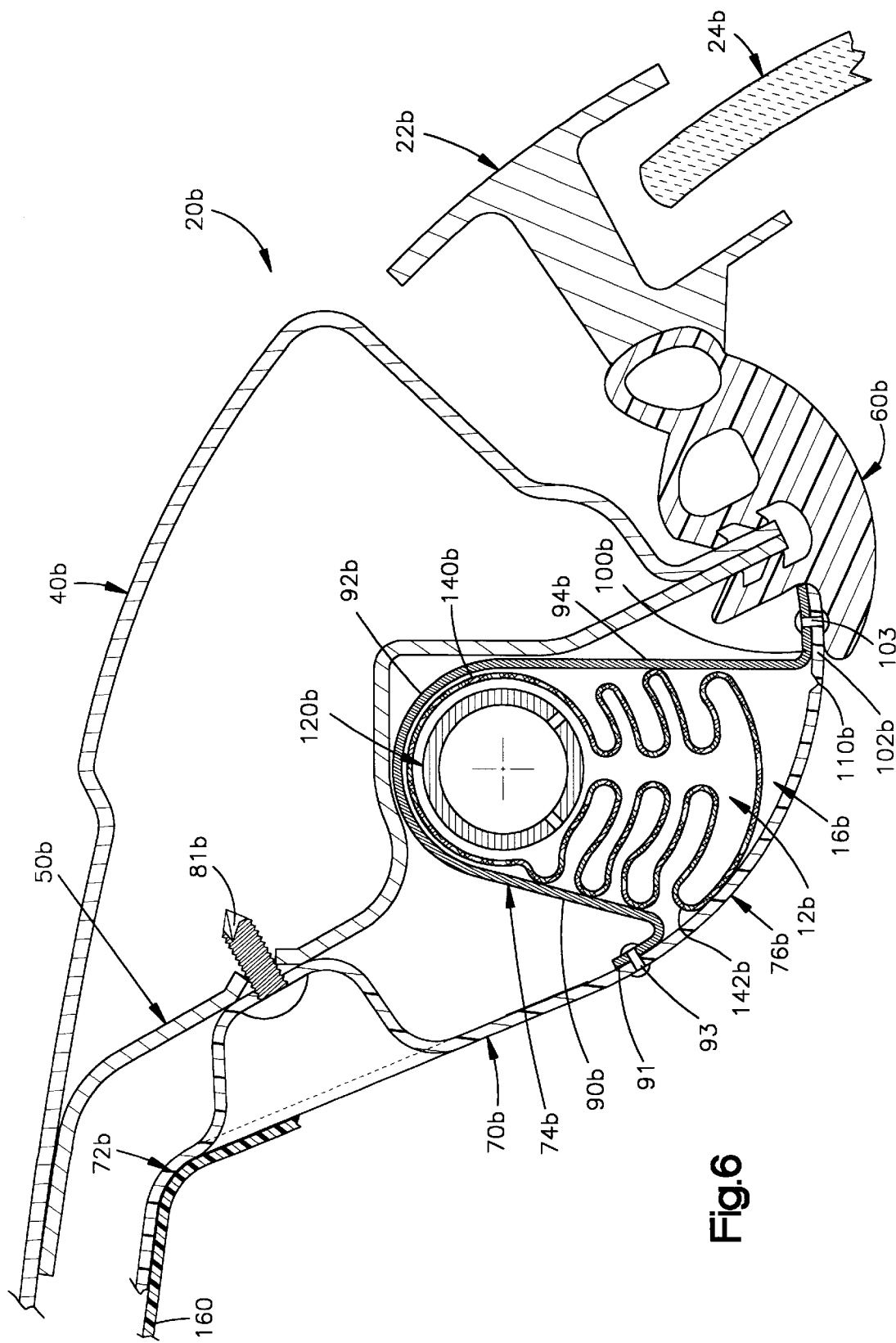
FIG. 6 is a view similar to FIG. 4 showing a vehicle safety apparatus in accordance a third embodiment of the present invention.

FIG. 6 illustrates a safety apparatus 10b in accordance with a third embodiment of the present invention. The safety apparatus 10b is similar in construction to the safety apparatus 10 (FIGS. 1–4) and parts which are the same are given the same reference numerals with the suffix "b" added for clarity.

The headliner assembly 70b in the safety apparatus 10b includes a housing portion 74b which is formed separately from, and subsequently attached to, the remaining parts of the headliner assembly. Specifically, the headliner assembly 70b includes a generally U-shaped housing portion 74b having an arcuate central portion 92b and parallel legs 90b and 94b which extend downward from the central portion. The first leg 90b has an end portion 91 which is secured to the door 76b by fasteners in the form of rivets 93. The second leg 94b has an end portion 100b which is secured to the mounting portion 102b of the headliner assembly 70b by fasteners in the form of rivets 103. The end portion 100b and the mounting portion 102b are held securely in place under the edge of the bulb seal 60b.

The protection device module 16b including the inflator 14b (not shown), the side curtain 12b, and the fill tube 120b, is located inside the housing portion 74b of the headliner assembly 70b. The dimensions of the housing portion 74b are selected so that the housing portion clamps or grips the mounting portion 140b of the side curtain 12b and the fill tube 120b.

The headliner assembly 70b has a tear seam 110b located adjacent to the end portion 100b of the second leg 94b of the housing portion 74b. The headliner assembly also optionally includes a separate Class A cover, a portion of which is shown at 160, to enable the headliner assembly 70b to be configured and manufactured optimally for structural considerations. The cover 160 may have a tear seam (not shown) through which the side curtain 20b deploys or an end portion releasably held under the bulb seal 60b.

The side curtain 12b, when inflated, presses outwardly on the door 76b of the headliner assembly 70b. The headliner assembly 70b ruptures at the predetermined weakened portion 110b. The door 76b pivots open, enabling the occupant contact portion 142b of the side curtain 12b to inflate into the vehicle occupant compartment. The side curtain 12b inflates generally vertically downward in the vehicle, inside the side structure 20b of the vehicle, to help protect an occupant of the vehicle.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus for helping to protect an occupant of a vehicle having a roof and a side structure, said apparatus comprising:

an inflatable vehicle occupant protection device having a deflated condition and having an inflated condition in which said protection device is inflated between the occupant and the vehicle side structure;

a fill member for directing inflation fluid into said protection device to inflate said protection device; and means for mounting said protection device and said fill member to the vehicle, said means for mounting comprising a headliner assembly comprising a single piece of material, said single piece of material having a support portion for location adjacent to the vehicle side structure, said support portion defining a chamber for receiving said fill member and said protection device when said protection device is in the deflated condition, said single piece of material including a headliner portion for location adjacent to the vehicle roof, said headliner portion of said single piece of material for extending inside of and generally parallel to the vehicle roof between said support portion of said single piece of material and a centerline of the vehicle.

2. An apparatus as set forth in claim 1 wherein said single piece of material includes a door which comprises a part of said support portion, said door having a closed condition when said protection device is in the deflated condition, said door being movable about a hinge portion of said single piece of material from the closed condition to an open condition upon inflation of said protection device to enable movement of said protection device out of said chamber.

3. An apparatus as set forth in claim 2 wherein said single piece of material has a predetermined weakened portion which retains said door in the closed condition, said weakened portion being rupturable upon inflation of said protection device to allow said door to move to said open condition and enable movement of said protection device out of said chamber into the inflated condition between the occupant and the vehicle side structure.

4. An apparatus as set forth in claim 2 wherein said door includes an edge portion which is releasably engaged by a bulb seal portion of the vehicle side structure to retain said door in the closed condition when said protection device is in the deflated condition, said door being released upon inflation of said protection device to allow said door to move to said open condition and enable movement of said protection device out of said chamber into the inflated condition between the occupant and the vehicle side structure.

5. An apparatus as set forth in claim 1 wherein said fill member is a fill tube.

6. An apparatus as set forth in claim 1 wherein said support portion of said single piece of material clamps said fill member and said protection device in said chamber.

7. An apparatus as set forth in claim 6 wherein said support portion is resiliently deformable to enable movement of said fill member into a clamped condition in said support portion.

8. An apparatus as set forth in claim 7 wherein said support portion extends around said fill member for more than 180 degrees when said fill member is in the clamped condition.

9. An apparatus as set forth in claim 1 wherein said material is plastic.

10. An apparatus for helping to protect an occupant of a vehicle having a side structure including a bulb seal and a roof panel extending from the side structure to the vehicle centerline, said apparatus comprising:

an inflatable vehicle occupant protection device having a deflated condition and having an inflated condition in which said protection device is inflated between the occupant and the vehicle side structure;

a fill tube for directing inflation fluid into said protection device to inflate said protection device;

a headliner assembly having a portion comprising a single piece of material, said single piece of material being extensible from said bulb seal to the vehicle centerline; and means for supporting said headliner assembly on the vehicle;

said headliner assembly including a housing portion defining a chamber for receiving said fill tube and said protection device when said protection device is in the deflated condition;

said single piece of material including a door which comprises a part of said portion, said door being movable relative to said housing portion from a closed condition closing said chamber to an open condition.

11. An apparatus as set forth in claim 10 wherein said housing portion of said headliner assembly clamps said fill tube and said protection device in said chamber when said door is in the closed condition.

12. An apparatus as set forth in claim 10 wherein said headliner assembly has a predetermined weakened portion which retains said door in the closed condition, said weakened portion being rupturable upon inflation of said protection device to allow said door to move to said open condition and enable movement of said protection device out of said chamber into the inflated condition between the occupant and the vehicle side structure.

13. An apparatus as set forth in claim 10 wherein said housing portion of said headliner assembly is resiliently deformable to enable movement of said fill tune and said protection device into a clamped condition in said housing portion.

14. An apparatus as set forth in claim 13 wherein said housing portion extends around said fill tube and said protection device for more than 180 degrees when said fill member is in the clamped condition.

* * * * *